US012355985B1

(12) United States Patent
Chan

(10) Patent No.: US 12,355,985 B1
(45) Date of Patent: Jul. 8, 2025

(54) SYSTEMS AND METHODS FOR EFFICIENT VIDEO ENCODING

(71) Applicant: Meta Platforms, Inc., Menlo Park, CA (US)

(72) Inventor: Chun-Wei Chan, Foster City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 435 days.

(21) Appl. No.: 17/873,560

(22) Filed: Jul. 26, 2022

(51) Int. Cl.
  *H04N 19/167* (2014.01)
  *H04N 19/119* (2014.01)
  *H04N 19/136* (2014.01)
  *H04N 19/164* (2014.01)
  *H04N 19/174* (2014.01)

(52) U.S. Cl.
  CPC ......... *H04N 19/167* (2014.11); *H04N 19/119* (2014.11); *H04N 19/136* (2014.11); *H04N 19/164* (2014.11); *H04N 19/174* (2014.11)

(58) Field of Classification Search
  CPC .. H04N 19/167; H04N 19/119; H04N 19/136; H04N 19/164; H04N 19/174
  See application file for complete search history.

(56) References Cited

U.S. PATENT DOCUMENTS

| 2017/0048534 | A1* | 2/2017 | Croxford | H04N 19/40 |
| 2019/0007686 | A1* | 1/2019 | Galpin | H04N 19/174 |
| 2019/0028714 | A1* | 1/2019 | Luo | H04N 19/176 |
| 2020/0293255 | A1* | 9/2020 | Lim | F16M 11/22 |
| 2020/0366895 | A1* | 11/2020 | De Luxan Hernandez | H04N 19/11 |
| 2023/0035306 | A1* | 2/2023 | Liu | H04N 19/597 |

* cited by examiner

*Primary Examiner* — Kyu Chae
(74) *Attorney, Agent, or Firm* — Eversheds Sutherland (US) LLP

(57) ABSTRACT

A computer-implemented method for efficiently encoding video may include (i) determining, by a computing device, that a video file is a candidate for vertical-slice-based region-of-interest compression, (ii) identifying a video encoder that supports horizontal-slice-based compression but does not support vertical-slice-based compression, (iii) rotating each frame of the video file ninety degrees, and (iv) performing, by the video encoder, horizontal-slice-based region-of-interest compression on the rotated video file. Various other methods, systems, and computer-readable media are also disclosed.

18 Claims, 6 Drawing Sheets

SYSTEMS AND METHODS FOR EFFICIENT VIDEO ENCODING

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
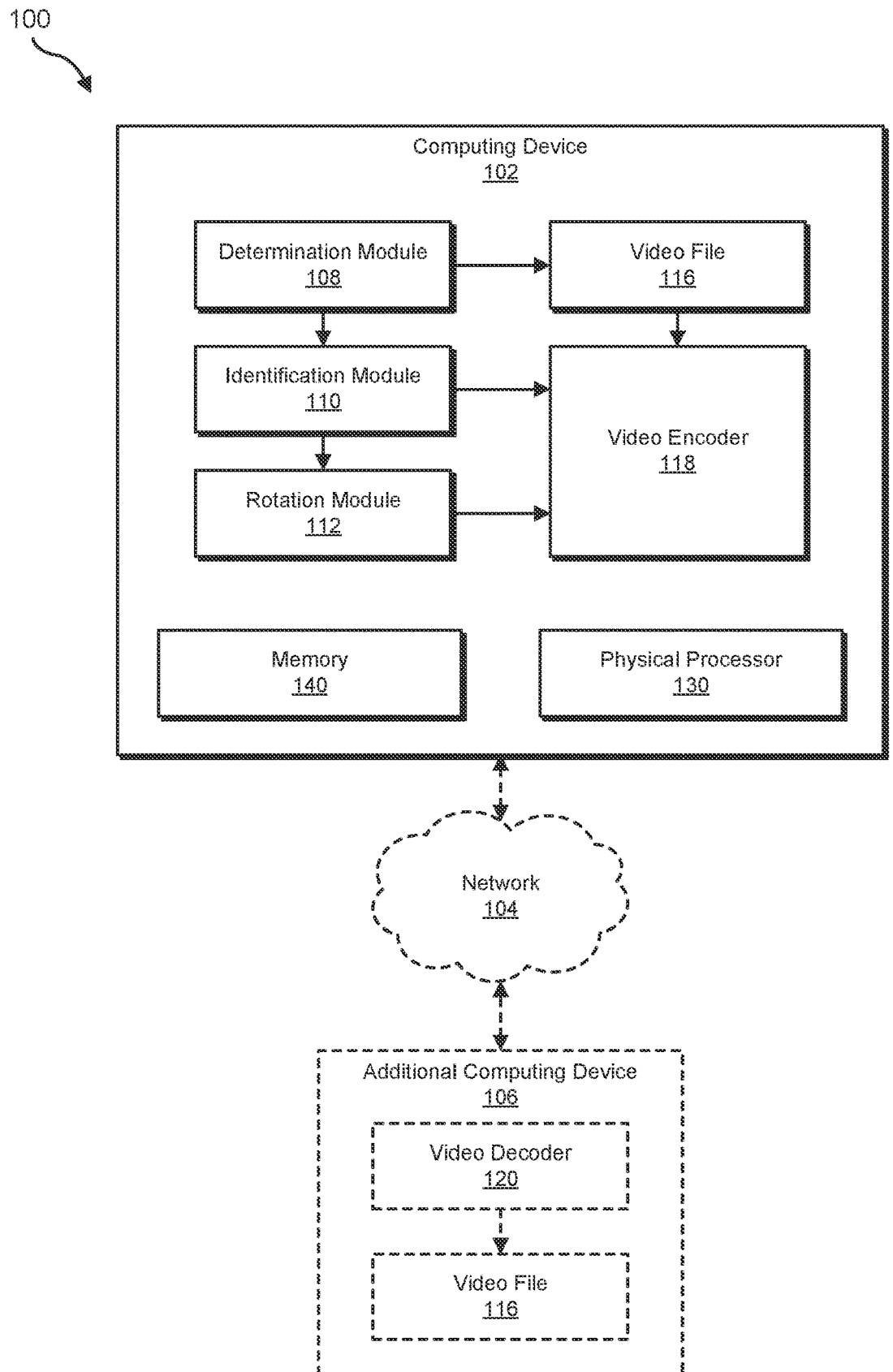
FIG. 1 is a block diagram of an exemplary system for efficient video encoding.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Video files are becoming increasingly large in terms of both resolution and data size. Better compression is important for efficient streaming of large video files. One solution is region-of-interest compression, where areas of the frame of interest to a viewer (e.g., a speaker's face) are compressed at a high level of quality and other regions are compressed at a lower level of quality. Region-of-interest compression is often done via dividing the frame into tiles. However, some legacy codecs may not support tiles and may only support horizontal slicing, which is typically not effective for videos that have a horizontal aspect ratio. The present disclosure is generally directed to systems and methods for rotating videos ninety degrees to take advantage of horizontal slicing in legacy codecs in order to perform vertical-slice-based region-of-interest compression on large video files.

In some embodiments, the systems described herein may improve the functioning of a computing device by improving the ability of the computing device to efficiently store and/or stream video. Additionally, the systems described herein may improve the fields of streaming video and/or videoconferencing by improving video streaming using region-of-interest compression on videos with various aspect ratios despite legacy codecs.

Figure 2:
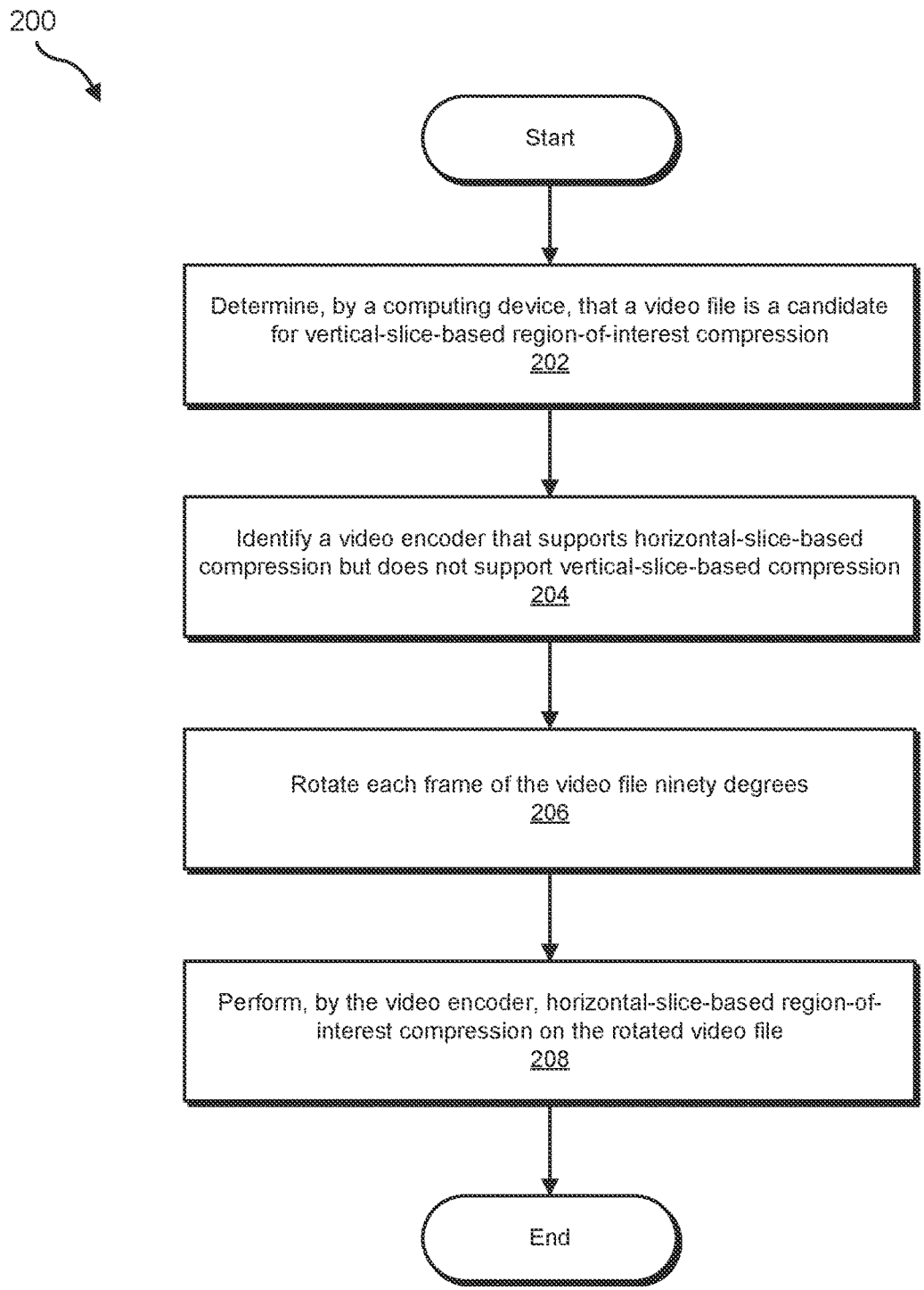
FIG. 2 is a flow diagram of an exemplary method for efficient video encoding.

The following will provide detailed descriptions of systems and methods for efficient video encoding with reference to FIGS. 1 and 2, respectively. Detailed descriptions of exemplary video frames at various stages of encoding and/or decoding will be provided with reference to FIGS. 3-6A.

In some embodiments, the systems described herein may efficiently encode videos on a computing device. FIG. 1 is a block diagram of an exemplary system 100 for efficient video encoding. In one embodiment, and as will be described in greater detail below, a computing device 102 may be configured with a determination module 108 that may determine that a video file 116 is a candidate for vertical-slice-based region-of-interest compression. In some embodiments, an identification module 110 may identify a video encoder 118 that supports horizontal-slice-based compression but does not support vertical-slice-based compression. In response, a rotation module 112 may rotate each frame of video file 116 by ninety degrees and video encoder 118 may perform horizontal-slice-based region-of-interest compression on the rotated video file. In some embodiments, computing device 102 may then transmit an encoded version of video file 116 to an additional computing device 106 via a network 104 to be decoded by a video decoder 120 on additional computing device 106.

Computing device 102 generally represents any type or form of computing device capable of reading computer-executable instructions. For example, computing device 102 may represent a personal computing device. Examples of computing device 102 may include, without limitation, a laptop, a desktop, a wearable device, a smart device, an artificial reality device, a personal digital assistant (PDA), etc. In some embodiments, computing device 102 may be a server. Additional examples of computing device 102 may include, without limitation, application servers, database servers, and/or any other relevant type of server. Although illustrated as a single entity in FIG. 1, computing device 102 may include and/or represent a group of multiple servers that operate in conjunction with one another.

Video file 116 generally represents any type of digital file that includes multiple frames of visual data. In some examples, a video file may be a live streaming video that is transmitted as it is recorded. For example, a video file may be a live streaming file posted to a social media platform and/or a video feed of a user participating in a video conference. In one embodiment, the live feed may be captured by a camera of the computing device that encodes the video (e.g., computing device 102). In other examples, a video file may be a stored video file that is recorded in its entirety before being stored and/or transmitted. For example, a video file may be a recording of a previous live stream, an episode of a television show, a movie, and/or any other type of recorded video.

Video encoder 118 generally represents any software and/or hardware that encodes video files. In some embodiments, a video encoder may encode a video file by transforming the video file into a different file format and/or compressing the video file to a smaller file size. In one embodiment, a video encoder may be part of a video codec that encodes and decodes video files. In some embodiments, a video codec may be a legacy codec that is not up-to-date with the most recent encoding innovations. In some examples, a video encoder may not be capable of tile-based region-of-interest compression and/or vertical-slice-based region-of-interest compression. For example, H.264 is a legacy codec that is capable of horizontal-slice-based compression but not vertical-sliced-based compression.

Region-of-interest compression may generally refer to any encoding and/or compression scheme that divides a frame of video into regions, determines one or more regions that are expected to be of interest to a viewer, and encodes these regions at higher quality (e.g., storing more information about those regions to display a clearer image at the cost of consuming more processing, transmission, and/or storage resources) than other regions of the image frame. In some embodiments, region-of-interest compression may be vertical-slice-based; that is, an encoder may divide a video frame into non-overlapping regions that each span the entire height of the frame but only a fraction of the width of the frame. In other embodiments, region-of-interest compression may be horizontal-slice-based, where an encoder divides a video frame into non-overlapping regions that each span the entire width of the frame but only a fraction of the height of the frame.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

FIG. 2 is a flow diagram of an exemplary method 200 for efficient video encoding. In some examples, at step 202, the systems described herein may determine, by a computing device, that a video file is a candidate for vertical-slice-based region-of-interest compression. For example, determination module 108 in FIG. 1 may, as part of computing device 102, determine that video file 116 is a candidate for vertical-slice-based region-of-interest compression.

Determination module 108 may determine that a video file is a candidate for vertical-slice-based region-of-interest compression in a variety of ways and/or contexts. For example, determination module 108 may identify a video file as a candidate based at least in part on file size (e.g., meeting a predetermined size threshold, exceeding a certain percentage of available bandwidth and/or other computing resources, etc.).

Figure 3:
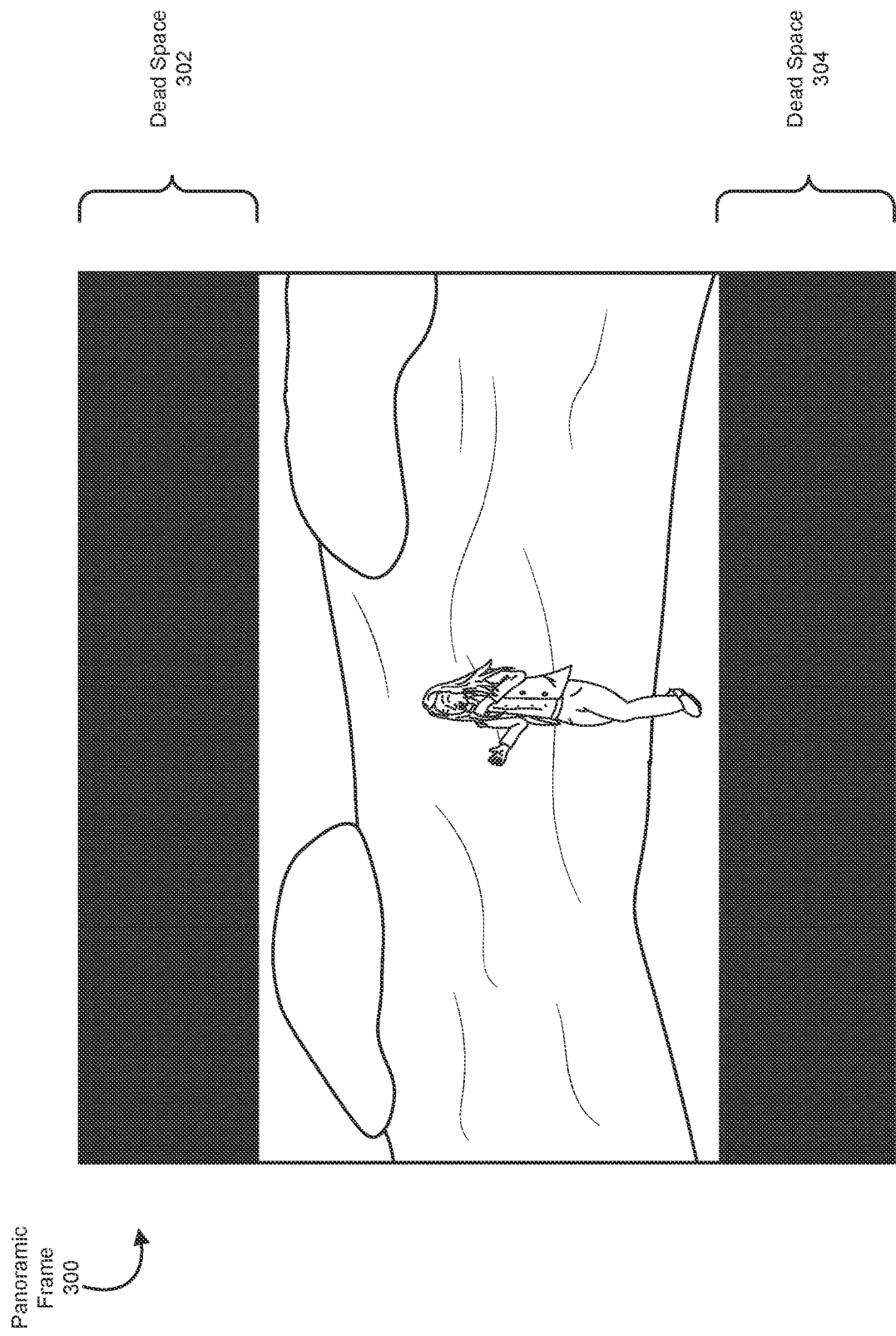
FIG. 3 is an illustration of an exemplary panoramic video frame.

Additionally or alternatively, determination module 108 may determine that a video file is a candidate based on an aspect ratio of the video. For example, if a video has a horizontal aspect ratio (i.e., any given video frame's width is greater than the video frame's height), determination module 108 may determine that the video is a candidate for vertical-slice-based video encoding. In some examples, determination module 108 may determine that a video file is a candidate despite not having a horizontal aspect ratio if the region of interest in the video has a horizontal aspect ratio. For example, if the video file is a panoramic video, the region of interest may be a horizontal area that is vertically centered within the frame while the remainder of the frame may be comparatively less important portions of the scene (e.g., empty sky or foreground) and/or dead space. In one example, as illustrated in FIG. 3, a panoramic frame 300 may have an equal width and height but may have an area of dead space 302 containing only blank pixels and/or a filler pattern at the top of the frame and/or an area of dead space 304 at the bottom of the frame. Because of these areas of dead space, the systems described herein may treat a panoramic video as a video with a horizontal aspect ratio and in some examples may determine that a panoramic video is a candidate for vertical-slice-based region-of-interest compression.

In some embodiments, determination module 108 may determine that a video file is a candidate in part by identifying a video file that is being created as part of a live stream. For example, determination module 108 may identify a video feed of a participant in a videoconference. Additionally or alternatively, determination module 108 may identify a recorded video that is being stored, re-encoded, and/or transmitted. For example, determination module 108 may determine that a video file that is currently compressed using a less efficient compression scheme is a candidate for vertical-slice-based region-of-interest compression.

Returning to FIG. 2, in some examples, at step 204, the systems described herein may identify a video encoder that supports horizontal-slice-based compression but does not support vertical-slice-based compression. For example, identification module 110 in FIG. 1 may, as part of computing device 102, identify a video encoder 118 that supports horizontal-slice-based compression but does not support vertical-slice-based compression.

Identification module 110 may identify the encoder in a variety of contexts. For example, the encoder may be the only encoder available or the most modern encoder available on the computing device. In another example, the video file may be expected to be transmitted to a device that cannot be assumed to have up-to-date decoders (e.g., a personal computer running an out-of-date operating system, an embedded system that experiences infrequent software updates, etc.) and the encoder may be the most up-to-date encoder that encodes files such that the files can be decoded by a decoder expected to be present on the device.

In some examples, at step 206, the systems described herein may rotate each frame of the video file ninety degrees. For example, rotation module 112 in FIG. 1 may, as part of computing device 102, rotate each frame of video file 116 ninety degrees.

Rotation module 112 may rotate video frames in a variety of ways. In some embodiments, rotation module 112 may rotate each frame ninety degrees clockwise. Alternatively, rotation module 112 may rotate each frame ninety degrees counter-clockwise.

In some examples, at step 208, the systems described herein may perform, by the video encoder, horizontal-slice-based region-of-interest compression on the rotated video file. For example, video encoder 118 in FIG. 1 may, as part of computing device 102, perform horizontal-slice-based region-of-interest compression on rotated video file 116.

The systems described herein may perform horizontal-slice-based region-of-interest compression on the rotated video file in a variety of ways. In some examples, the systems described herein may encode every slice within each frame with the same encoding process if not the same codec. Alternatively, the systems described herein may independently encode and decode each slice. For example, if the encoder receives a signal to reduce the output bitrate, the encoder may not encode some slices. In another example, the systems described herein may not transmit a subset of the slices in order to reduce bandwidth usage. In one example, if the decoder is lagging in terms of decoding versus receiving data, the receiver may not forward a subset of the slices on to the decoder and/or the decoder may not decode a subset of the slices.

Figure 4A:
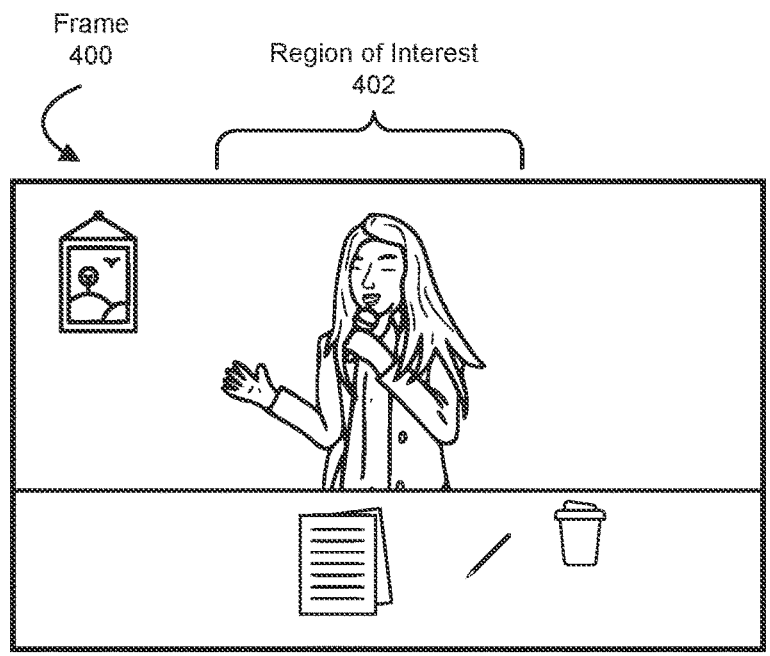
FIGS. 4A and 4B are illustrations of an exemplary video frame.
Figure 4B:
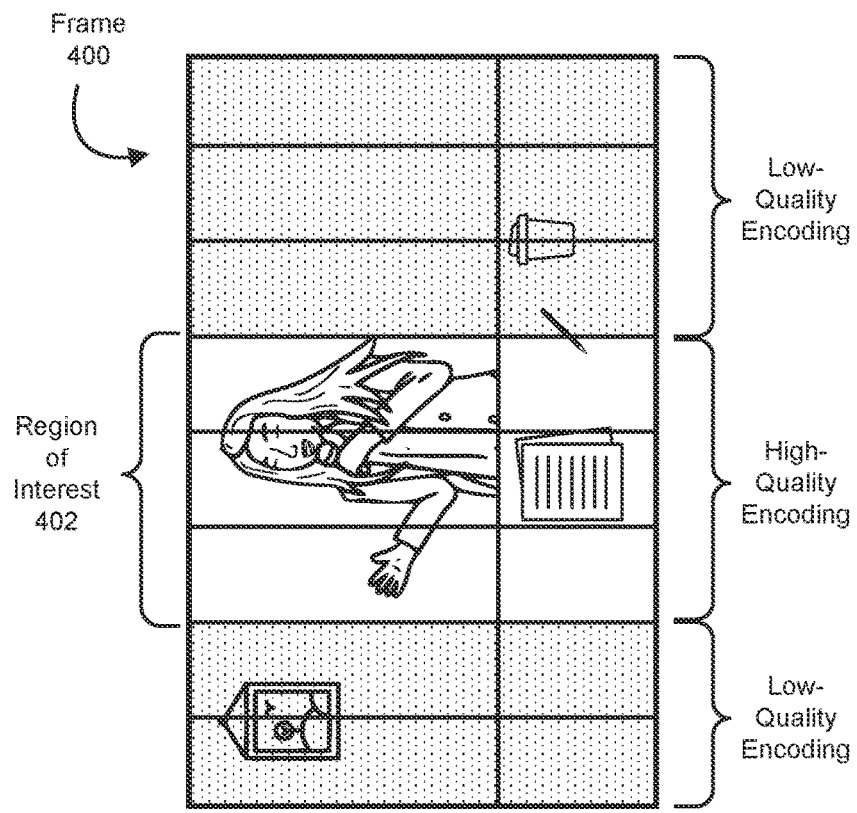

In some embodiments, the systems described herein may perform region-of-interest compression by identifying a region of interest in a video frame. For example, as illustrated in FIG. 4A, a video frame 400 may depict a woman at a desk with various objects on the desk and/or in the background. In this example, the systems described herein may identify region of interest 402 that includes the woman but does not include all of the miscellaneous objects. Because region of interest 402 includes an area of video frame 400 that is taller than it is wide, vertical-slice-based region-of-interest compression may be an efficient form of compression for video frame 400. To apply this type of compression with a legacy encoder that only supports horizontal-slice-based region-of-interest compression, the systems described herein may rotate frame 400 by ninety degrees, as illustrated in FIG. 4B. Once frame 400 is rotated, the encoder may divide frame 400 into horizontal slices, encoding the slices that make up region of interest 402 with comparatively high-quality encoding while encoding the slices that make up the rest of frame 400 with comparatively low-quality encoding.

Figure 5:
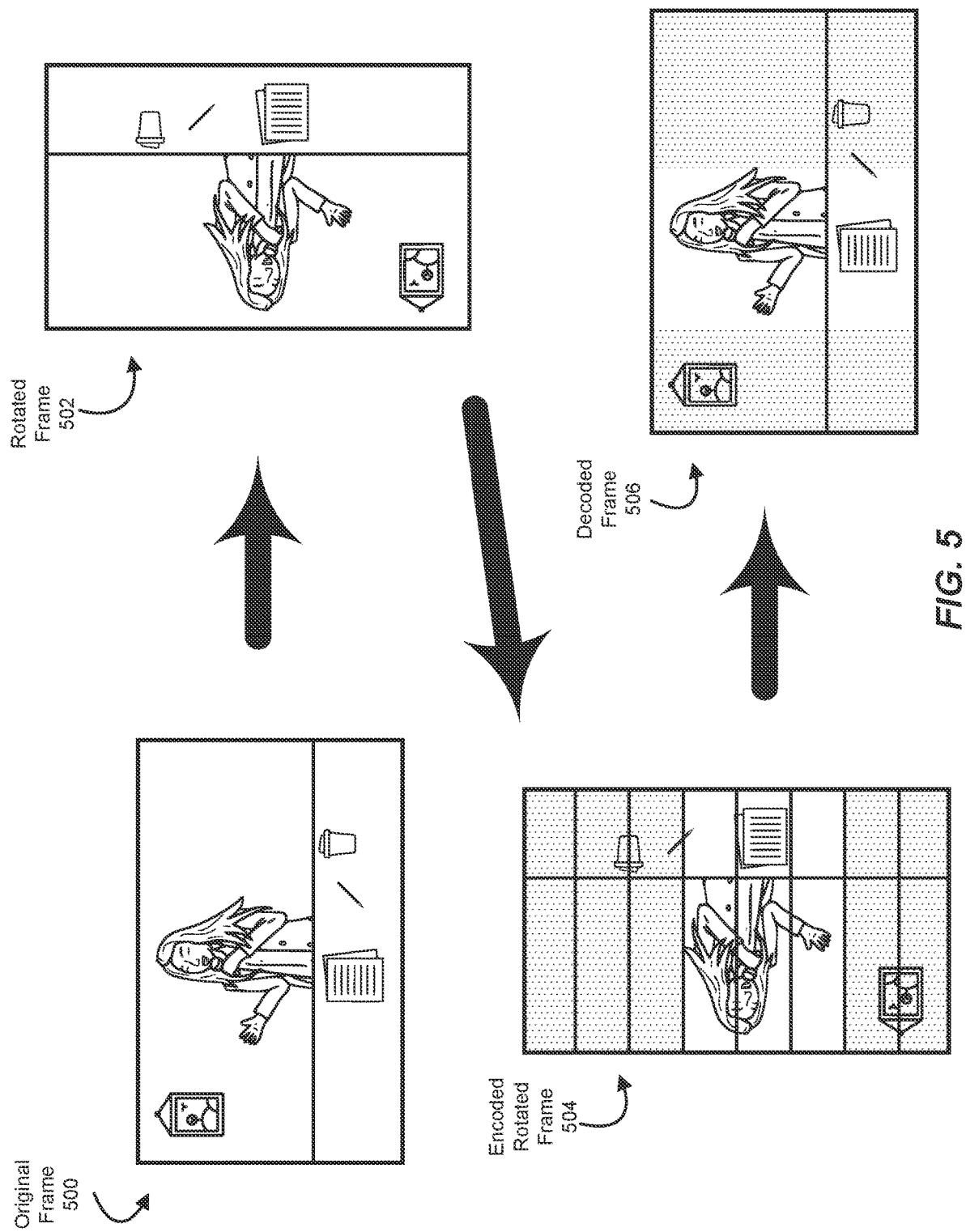
FIG. 5 is an additional illustration of an exemplary video frame.

In some embodiments, a video file may go through a series of transformations facilitated by the systems described herein. For example, as illustrated in FIG. 5, the systems described herein may identify an original frame 500 and may then rotate original frame 500 to produce rotated frame 502. The systems described herein may provide rotated frame 502 to an encoder than may produce encoded rotated frame 504. The systems described herein may transmit a video file containing encoded rotated frame 504 to an additional device (e.g., a laptop, tablet, smart TV, etc.) that may decode the video file, rotating each frame in the process, to produce decoded frame 506. In some embodiments, while transmitting the video file the systems described herein may transmit a metadata flag directing the decoder to rotate each frame of the encoded rotated video file ninety degrees such that the decoded video file is oriented the same as before the video file was rotated (e.g., rotate counter-clockwise if the video frame was rotated clockwise or vice versa). In some examples, the systems described herein may take advantage of a built-in metadata field designed to allow a decoder to correct for video taken in portrait mode and displayed in landscape mode or vice versa.

Figure 6A:
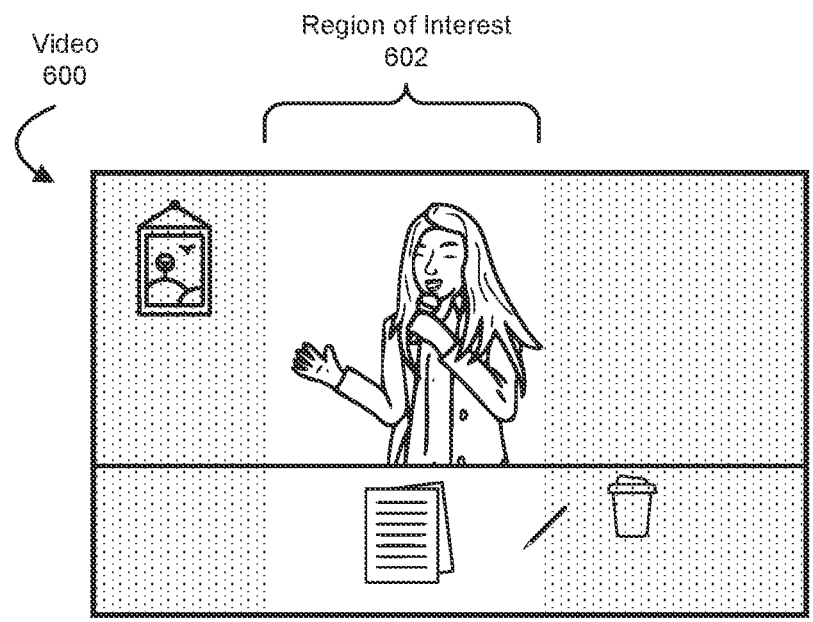
FIGS. 6A and 6B are illustrations of an exemplary video frame transmitted via limited bandwidth.
Figure 6B:
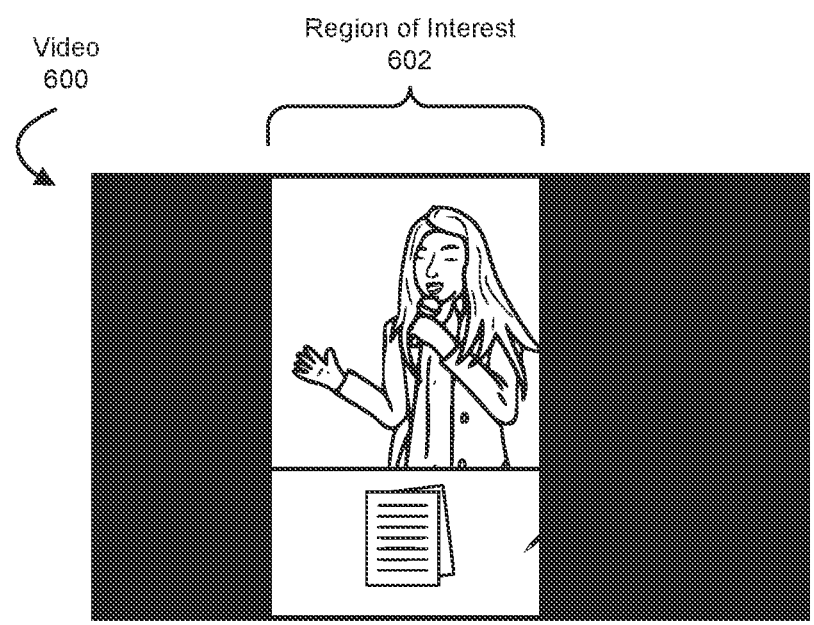

In some embodiments, the systems described herein may compress the video file to a smaller size by dropping portions of a frame that are outside the region of interest in response to detecting reduced bandwidth in a connection over which the video file is being transmitted. For example, as illustrated in FIG. 6A, a video 600 of a participant in a videoconference may have a region of interest 602 that includes the area of the frame showing the participant. If the bandwidth of the videoconference connection decreases (e.g., falls below a certain threshold, falls below a certain percentage of the initial bandwidth, etc.), the systems described herein may drop the sections of video 600 outside of region of interest 602, as illustrated in FIG. 6B. In some embodiments, dropped portions of the video may be displayed as black pixels and/or pixels in a pattern (e.g., colored based on colors within the region of interest). Alternatively, dropped regions of the video frame may continue displaying pixels from the most recent previous frame where those regions were not dropped.

As described above, the systems and methods described herein may encode video efficiently with legacy codecs by rotating frames of video ninety degrees, achieving vertical-sliced-based region-of-interest compression on legacy codecs that are only capable of horizontal-slice-based compression. By compressing videos in this way, the systems described herein may encode large video files into comparatively smaller files (e.g., as compared to the same video files compressed in other ways), saving processing power, bandwidth, and/or storage resources while providing users with a high-quality video-viewing experience.

EXAMPLE EMBODIMENTS

Example 1: A method for efficient video encoding may include (i) determining, by a computing device, that a video file is a candidate for vertical-slice-based region-of-interest compression, (ii) identifying a video encoder that supports horizontal-slice-based compression but does not support vertical-slice-based compression, (iii) rotating each frame of the video file ninety degrees, and (iv) performing, by the video encoder, horizontal-slice-based region-of-interest compression on the rotated video file.

Example 2: The computer-implemented method of example 1 may further include transmitting the encoded rotated video file to an additional computing device that is configured with a decoder capable of decoding the encoded rotated video file.

Example 3: The computer-implemented method of examples 1-2, where transmitting the encoded rotated video includes transmitting a metadata flag directing the decoder to rotate each frame of the encoded rotated video file ninety degrees such that the decoded video file is oriented the same as before the video file was rotated.

Example 4: The computer-implemented method of examples 1-3, where the video file includes a live video feed captured by a camera of the computing device.

Example 5: The computer-implemented method of examples 1-4, where the live video feed includes a user feed for a participant in a videoconference.

Example 6: The computer-implemented method of examples 1-5, where performing, by the video encoder, the horizontal-slice-based region-of-interest compression on the rotated video file includes, for each frame of the rotated video file (i) dividing the frame into slices horizontally, (ii) identifying a subset of slices that include a region of interest for an expected viewer, and (iii) encoding the subset of slices at a higher quality than slices not in the subset.

Example 7: The computer-implemented method of examples 1-6 may further include (i) transmitting the encoded rotated video file to an additional computing device, (ii) detecting a reduction in bandwidth of a connection to the additional computing device, and (iii) in response to detecting the reduction in bandwidth, encoding the rotated video file such that the slices not in the subset that include the region of interest are not included in the encoded rotated video file.

Example 8: The computer-implemented method of examples 1-7, where determining that the video file is the candidate for the vertical-slice-based region-of-interest compression includes determining that a width of an aspect ratio of the video file exceeds a height of the aspect ratio of the video file.

Example 9: A system for efficient video encoding may include at least one physical processor and physical memory including computer-executable instructions that, when executed by the physical processor, cause the physical processor to (i) determine, by a computing device, that a video file is a candidate for vertical-slice-based region-of-interest compression, (ii) identify a video encoder that supports horizontal-slice-based compression but does not support vertical-slice-based compression, (iii) rotate each frame of the video file ninety degrees, and (iv) perform, by the video encoder, horizontal-slice-based region-of-interest compression on the rotated video file.

Example 10: The system of example 9, where the computer-executable instructions cause the physical processor to transmit the encoded rotated video file to an additional computing device that is configured with a decoder capable of decoding the encoded rotated video file.

Example 11: The system of examples 9-10, where transmitting the encoded rotated video includes transmitting a metadata flag directing the decoder to rotate each frame of the encoded rotated video file ninety degrees such that the decoded video file is oriented the same as before the video file was rotated.

Example 12: The system of examples 9-11, where the video file includes a live video feed captured by a camera of the computing device.

Example 13: The system of examples 9-12, where the live video feed includes a user feed for a participant in a videoconference.

Example 14: The system of examples 9-13, where performing, by the video encoder, the horizontal-slice-based region-of-interest compression on the rotated video file includes, for each frame of the rotated video file (i) dividing the frame into slices horizontally, (ii) identifying a subset of slices that include a region of interest for an expected viewer, and (iii) encoding the subset of slices at a higher quality than slices not in the subset.

Example 15: The system of examples 9-14, where the computer-executable instructions further cause the physical processor to (i) transmit the encoded rotated video file to an additional computing device, (ii) detect a reduction in bandwidth of a connection to the additional computing device, and (iii) in response to detecting the reduction in bandwidth, encode the rotated video file such that the slices not in the subset that include the region of interest are not included in the encoded rotated video file.

Example 16: The system of examples 9-15, where determining that the video file is the candidate for the vertical-slice-based region-of-interest compression includes determining that a width of an aspect ratio of the video file exceeds a height of the aspect ratio of the video file.

Example 17: A non-transitory computer-readable medium may include one or more computer-readable instructions that, when executed by at least one processor of a computing device, cause the computing device to (i) determine, by a computing device, that a video file is a candidate for vertical-slice-based region-of-interest compression, (ii) identify a video encoder that supports horizontal-slice-based compression but does not support vertical-slice-based compression, (iii) rotate each frame of the video file ninety degrees, and (iv) perform, by the video encoder, horizontal-slice-based region-of-interest compression on the rotated video file.

Example 18: The non-transitory computer-readable-medium of example 17, where the computer-readable instructions further cause the computing device to transmit the encoded rotated video file to an additional computing device that is configured with a decoder capable of decoding the encoded rotated video file.

Example 19: The non-transitory computer-readable-medium of examples 17-18, where transmitting the encoded rotated video includes transmitting a metadata flag directing the decoder to rotate each frame of the encoded rotated video file ninety degrees such that the decoded video file is oriented the same as before the video file was rotated.

Example 20: The non-transitory computer-readable-medium of examples 17-19, where the video file includes a live video feed captured by a camera of the computing device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data to be transformed, transform the video data into an aspect ratio more suitable for a specific encoder, output a result of the transformation to encode the video, use the result of the transformation to stream the encoded video, and store the result of the transformation for later streaming. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    determining, by a computing device, that a video file is a candidate for vertical-slice-based region-of-interest compression;
    identifying a video encoder that supports horizontal-slice-based compression but does not support vertical-slice-based compression;
    rotating each frame of the video file ninety degrees; and
    performing, by the video encoder, horizontal-slice-based region-of-interest compression on the rotated video file, wherein performing, by the video encoder, the horizontal-slice-based region-of-interest compression on the rotated video file comprises, for each frame of the rotated video file:
        dividing the frame into slices horizontally;
        identifying a subset of slices that comprise a region of interest for an expected viewer; and
        encoding the subset of slices at a higher quality than slices not in the subset.

2. The computer-implemented method of claim 1, further comprising transmitting the encoded rotated video file to an additional computing device that is configured with a decoder capable of decoding the encoded rotated video file.

3. The computer-implemented method of claim 2, wherein transmitting the encoded rotated video comprises transmitting a metadata flag directing the decoder to rotate each frame of the encoded rotated video file ninety degrees such that the decoded video file is oriented the same as before the video file was rotated.

4. The computer-implemented method of claim 1, wherein the video file comprises a live video feed captured by a camera of the computing device.

5. The computer-implemented method of claim 4, wherein the live video feed comprises a user feed for a participant in a videoconference.

6. The computer-implemented method of claim 1, further comprising:
    transmitting the encoded rotated video file to an additional computing device;
    detecting a reduction in bandwidth of a connection to the additional computing device; and
    in response to detecting the reduction in bandwidth, encoding the rotated video file such that the slices not in the subset that comprise the region of interest are not included in the encoded rotated video file.

7. The computer-implemented method of claim 1, wherein determining that the video file is the candidate for the vertical-slice-based region-of-interest compression comprises determining that a width of an aspect ratio of the video file exceeds a height of the aspect ratio of the video file.

8. A system comprising:
    at least one physical processor;
    physical memory comprising computer-executable instructions that, when executed by the physical processor, cause the physical processor to:
        determine that a video file is a candidate for vertical-slice-based region-of-interest compression;
        identify a video encoder that supports horizontal-slice-based compression but does not support vertical-slice-based compression;
        rotate each frame of the video file ninety degrees; and
        perform, by the video encoder, horizontal-slice-based region-of-interest compression on the rotated video file, wherein performing, by the video encoder, the horizontal-slice-based region-of-interest compression on the rotated video file comprises, for each frame of the rotated video file:
            dividing the frame into slices horizontally;
            identifying a subset of slices that comprise a region of interest for an expected viewer; and
            encoding the subset of slices at a higher quality than slices not in the subset.

9. The system of claim 8, wherein the computer-executable instructions further cause the physical processor to transmit the encoded rotated video file to an additional computing device that is configured with a decoder capable of decoding the encoded rotated video file.

10. The system of claim 9, wherein transmitting the encoded rotated video comprises transmitting a metadata flag directing the decoder to rotate each frame of the encoded rotated video file ninety degrees such that the decoded video file is oriented the same as before the video file was rotated.

11. The system of claim 8, wherein the video file comprises a live video feed captured by a camera of the computing device.

12. The system of claim 11, wherein the live video feed comprises a user feed for a participant in a videoconference.

13. The system of claim 8, wherein the computer-executable instructions further cause the physical processor to:
- transmit the encoded rotated video file to an additional computing device;
- detect a reduction in bandwidth of a connection to the additional computing device; and
- in response to detecting the reduction in bandwidth, encode the rotated video file such that the slices not in the subset that comprise the region of interest are not included in the encoded rotated video file.

14. The system of claim 8, wherein determining that the video file is the candidate for the vertical-slice-based region-of-interest compression comprises determining that a width of an aspect ratio of the video file exceeds a height of the aspect ratio of the video file.

15. A non-transitory computer-readable medium comprising one or more computer-readable instructions that, when executed by at least one processor of a computing device, cause the computing device to:
- determine that a video file is a candidate for vertical-slice-based region-of-interest compression;
- identify a video encoder that supports horizontal-slice-based compression but does not support vertical-slice-based compression;
- rotate each frame of the video file ninety degrees; and
- perform, by the video encoder, horizontal-slice-based region-of-interest compression on the rotated video file, wherein performing, by the video encoder, the horizontal-slice-based region-of-interest compression on the rotated video file comprises, for each frame of the rotated video file:
  - dividing the frame into slices horizontally;
  - identifying a subset of slices that comprise a region of interest for an expected viewer; and
  - encoding the subset of slices at a higher quality than slices not in the subset.

16. The non-transitory computer-readable medium of claim 15, wherein the computer-readable instructions further cause the computing device to transmit the encoded rotated video file to an additional computing device that is configured with a decoder capable of decoding the encoded rotated video file.

17. The non-transitory computer-readable medium of claim 16, wherein transmitting the encoded rotated video comprises transmitting a metadata flag directing the decoder to rotate each frame of the encoded rotated video file ninety degrees such that the decoded video file is oriented the same as before the video file was rotated.

18. The non-transitory computer-readable medium of claim 15, wherein the video file comprises a live video feed captured by a camera of the computing device.

* * * * *